United States Patent
Wagner et al.

[15] 3,689,489
[45] Sept. 5, 1972

[54] SUBSTITUTED 4-AMINOQUINAZOLINES AND A PROCESS FOR THEIR PRODUCTION

[72] Inventors: Klaus Wagner, Cologne, Buchheim; Ernst Roos, Cologne, Flittard, both of Germany

[73] Assignee: Farbenfabriken Bayer Aktiengesellschaft, Leverkusen, Germany

[22] Filed: Aug. 13, 1969

[21] Appl. No.: 849,868

[30]     Foreign Application Priority Data

Aug. 31, 1968    Germany..........P 17 95 271.5

[52] U.S. Cl. ....260/256.4 Q, 260/41 C, 260/256.5 R
[51] Int. Cl. ..............................................C07d 51/48
[58] Field of Search .................260/256.4 Q, 256.5 R

[56]         References Cited

OTHER PUBLICATIONS

Davoll – C. A. 66, 18720g (1967)

Primary Examiner—Alex Mazel
Assistant Examiner—R. V. Rush
Attorney—Burgess, Dinklage & Sprung

[57]         ABSTRACT

A process for preparation of 4-aminoquinazolines and novel 4-aminoquinazolines. In the process a benzonitrile derivative substituted in the 2-position by a halogen atom or alkoxy, alkylthio, aryloxy or arylthio group and in the 3- and/or 5-position by an electronegative radical, is reacted with a compound corresponding to the general formula

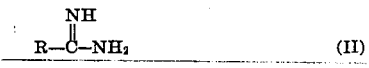

in which R represents a hydrogen atom, a hydrocarbon radical, an amino group, mono- or di-substituted amino group or a substituted sulphydryl group, in an inert solvent.

9 Claims, No Drawings

SUBSTITUTED 4-AMINOQUINAZOLINES AND A PROCESS FOR THEIR PRODUCTION

This invention relates to substituted 4-aminoquinazolines and to a process for the preparation thereof.

It is already known that 2,4-diaminoquinazolines are obtained by reacting o-aminobenzonitriles with dicyandiamide (cf. German Patent specification No. 737,931, and U.S. Patent specification No. 2,945,859).

Unfortunately, neither of these processes has acquired any commercial significance because the o-aminobenzonitriles required as starting materials are difficult to obtain.

The present invention relates to a process for the preparation of substituted 4-aminoquinazolines, wherein a benzonitrile derivative substituted in the 2-position by a halogen atom or an alkoxy, alkylthio, aryloxy or arylthio groups and in the 3- and/or 5-position by an electronegative radical, is reacted with a compound corresponding to the general formula

in which R represents a hydrogen atom, a hydrocarbon radical, an amino group, a mono- or di-substituted amino group or a substituted sulphydryl group, in an inert solvent.

Preferred benzonitrile derivatives for use in the process according to the invention include compounds having the general formula

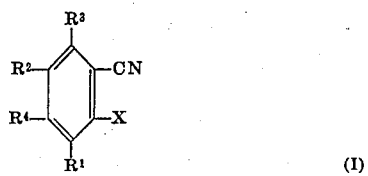

in which X represents a halogen atom, or an alkoxy, alkylthio, aryloxy or arylthio group with preferably up to two carbon atoms in the hydrocarbon radicals, $R_1$, $R_2$, $R_3$ and $R_4$, which may be the same or different, each represents hydrogen or an alkyl, alkoxy, alkylthio, aryloxy or arylthio group; and one or both of the radicals $R_1$ and $R_2$ must represent an electro-negative radical such as a nitro, cyano or sulphonyl group.

Examples of suitable benzonitrile derivatives may be represented by the following formulas:

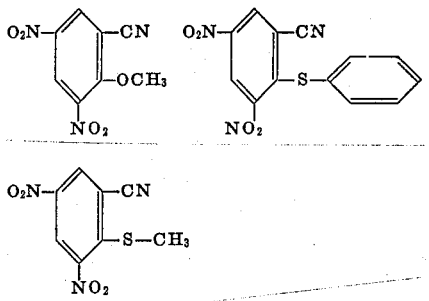

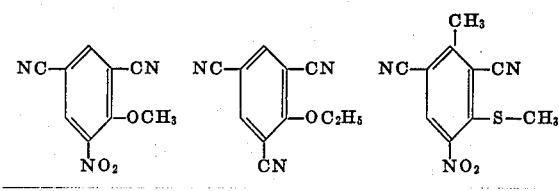

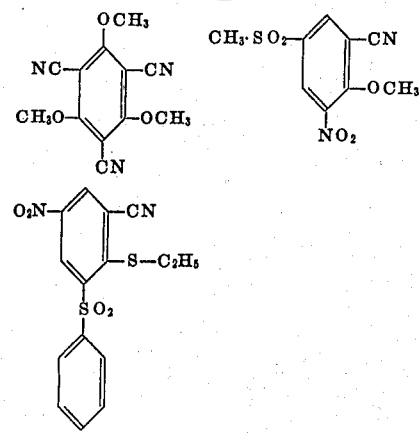

Suitable condensation components may be represented by the general formula

in which R represents a hydrogen atom, a hydrocarbon radical, an amino group, a mono- or disubstituted amino group or a substituted sulphydryl group. Under the above definition, hydrocarbon radicals are linear or branched alkyl radicals, particularly those with from one to four carbon atoms, and aryl radicals with up to 12 carbon atoms, for example phenyl, naphthyl, tolyl and diphenyl radicals.

The following are examples of condensation components of the above structure: formamidine, acetamidine, propionamidine, benzamidine, guanidine, N-methylguanidine, N,N-dimethylguanidine, N-phenyl-guanidine, and N-tolyguanidine.

The 4-aminoquinazolines prepared by the process according to the invention may be represented by the general formula

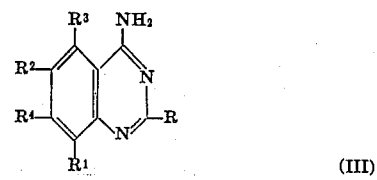

in which R represents a hydrogen atom, a hydrocarbon radical, an amino group, a mono- or disubstituted amino group or a substituted sulphydryl group, $R_1$ and $R_2$ represent electronegative groups, such as nitro, cyano or sulphonyl groups, and $R_3$ and $R_4$ represent hydrogen atoms and/or alkyl, alkoxy, alkylthio, aryloxy or arylthio groups.

Accordingly, the reaction is accompanied not only by elimination of the group X in the form of the corresponding hydrogen halide, alcohol or mercaptan, but also by cyclisation with the cyano group in the ortho-position to form the 4-aminoquinazoline derivative. Some of the 4-aminoquinazolines obtained by the process have the following formulas:

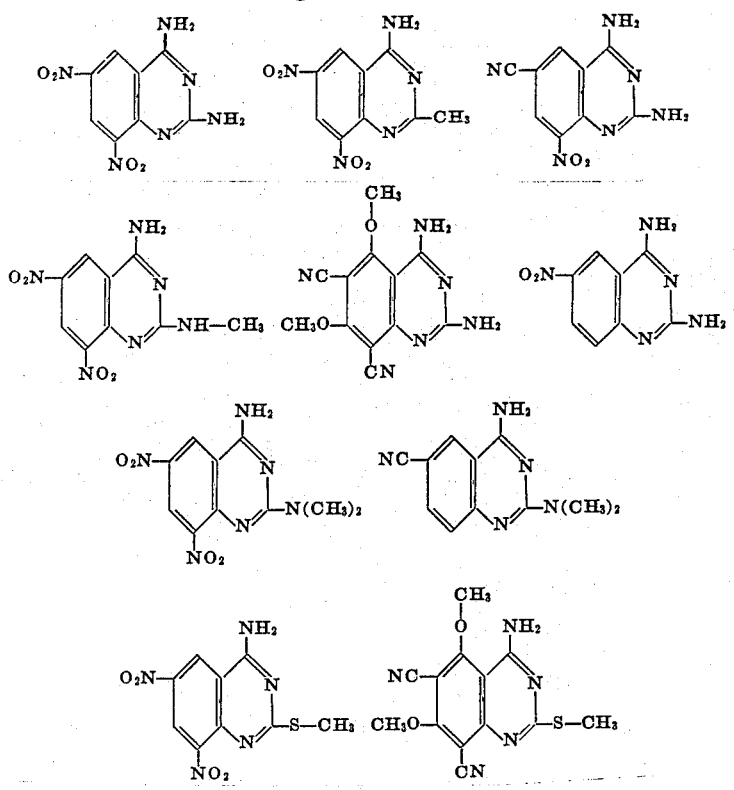

The reaction according to the invention is carried out in the presence of inert solvents preferably polar organic solvents, preferably at temperature of from 20° to 160°C, in particular at temperature from 40° to 60°C. Suitable solvents include methanol, ethanol, propanol, dioxan, and dimethyl-formamide.

The process is normally carried out by reacting a solution of the corresponding benzonitrile of general formula I, for example in methanol, at a temperature of from 40° to 60°C, with an equimolar quantity by weight of the condensation component II in portions, and subsequently stirring the reaction mixture for a while at about 60°C.

The new 4-aminoquinazolines that are formed during the reaction are usually precipitated during the reaction in the form of yellow to red crystalline compounds and may be separated by the usual methods, and the pure product may be isolated in high yields after washing with water or methanol.

The process according to the invention is explained in detail by the following general reaction equation in which the radicals R—R⁴ and X are as defined above, and also by the following Examples:

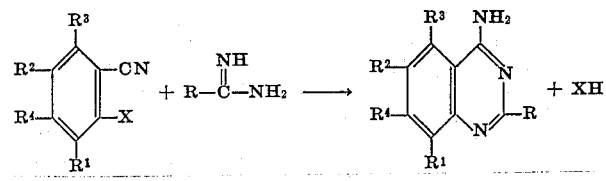

The substituted 4-aminoqunazolines are suitable for use as yellow, orange or red pigments, for example for dyeing plastics.

A mixture of 65 parts by weight of polyvinyl chloride, 35 parts by weight of di-isooctylphthalate, 2 parts by weight of dibutyl tin mercaptide, 0.5 parts by weight of titanium dioxide and 0.5 parts by weight of 2,4-diamino-6,8-dinitroquinazoline, which was finely divided by grinding in the presence of sodium chloride and N-methylpyrrolidone, is colored on mixing rolls at 165°C. An orange-red colored mass is obtained which may be used for the production of sheeting and mouldings. The color finish obtained is distinguished by its fastness both to light and to plasticizers. Color finishes of similar shade and fastness are obtained when the other 4-aminoquinazolines obtainable by the process according to the invention are worked in.

EXAMPLE 1

44.6 g (0.2 mol) of 2,4-dinitro-6-cyano-anisole are dissolved in 400 cc of methanol. A solution of 11.8 g (0.2 mol) of guanidine in 100 cc of methanol is slowly added to this solution while stirring at 40° to 50°C, and the reaction mixture is stirred for another 3 hours at 60°C. After cooling, the orange-colored product that is precipitated is removed by filtration under suction, the filtration residue is washed with water and then with methanol and finally dried. 2,4-diamino-6,8-dinitroquinazoline decomposing at 340°C is obtained in a yield of 45 g (90 percent of the theoretical).

Analysis: $C_8H_6N_6O_4$ (250.2)
Calculated: C 38.4% H 2.4% N 33.6% O 25.5%
Found: C 38.3% H 2.8% N 34.2% O 25.5%

EXAMPLE 2

35.6 g (0.2 mol) of 2-cyano-4-nitro-anisole are dissolved in 300 cc of dimethyl formamide, and 18 g (0.1 mol) of guanidine carbonate are added to the resulting solution. The reaction mixture is heated for 3 hours at 130°C and left to cool and the orange-red product that is precipitated is removed by filtration under suction. After washing with water and methanol, 2,4-diamino-6nitroquinazoline in the form of orange-red, small needle-mass, melting at temperatures above 360°C, is obtained in a yield of 36 g (88 percent of the theoretical).
Analysis: $C_8H_7N_5O_2$ (205.1)
Calculated: C 46.8% H 3.4% N 34.2% O 15.6%
Found: C 47.1% H 3.7% N 34.8% O.15.5%

EXAMPLE 2a

If 2-cyano-4-nitrochlorobenzene is used as the starting product instead of 2-cyano-4-nitro-anisole, the 2,4-diamino-6-nitroquinazoline is obtained in a yield of 75 % of the theoretical.

EXAMPLE 3

20.3 g (0.1 mol) of 2,4-dicyano-6-nitro-anisole are dissolved in 250 cc of methanol. A solution of 4.4 g (0.1 mol) of formamidine in 50 cc of methanol is then added in portions to the resulting solution while stirring at 40° to 50°C. The reaction mixture is then stirred for another 2 hours at 60°C, and left to cool, and the yellow-colored product that is precipitated is removed by filtration under suction.

After washing with water and methanol, 4-amino 6-cyano-8-nitroquinazoline is obtained in a yield of 12 g (56 percent of the theoretical). This compound crystallises from aqueous dimethyl formamide in the form of pale yellow needles melting at temperatures above 360°C.
Analysis: $C_9H_5N_5O_2$ (215.1)
calculated: C 50.2% H 2.3% O 14.9% N 32.6%
Found: C 50.1% H 2.7% O 15.5% N 32.1%

EXAMPLE 4

22.3 g (0.1 mol) of 2,4-dinitro-6-cyano-anisole are dissolved in 200 cc of methanol, and a solution of 12.0 g (0.1 mol) of benzamidine in 100 cc of methanol is added in portions to the resulting solution while stirring at 40° to 50°C. The reaction mixture is stirred for another 3 hours at 60°C, and left to cool and the resulting small coppery needles removed by filtration under suction. After washing with water and methanol, 2-phenyl-4-amino-6,8dinitroquinazoline melting at 329°C is obtained in a yield of 22 g (71percent of the theoretical).
Analysis: $C_{14}H_9N_5O_4$ (311.2)
Calculated: C 54.0% H 2.9% O 20.6% N 22.5%
Found: C 53.8% H 3.0% O 20.9% N 22.5%

What we claim is:
1. A process for the preparation of substituted 4-aminoquinazoline, wherein a benzonitrile derivative of the formula:

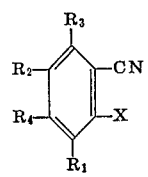

in which:
$x$ represents halogen, methoxy or ethoxy,
$R_3$ and $R_4$ each represents hydrogen, methyl or methoxy,
$R_1$ and/or $R_2$ is nitro, cyano, methyl sulphonyl, or phenyl sulphonyl,
is reacted with a compound of the formula:

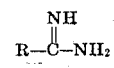

in which R is hydrogen, alkyl of up to four carbon atoms, amino, mono-or di-methyl substituted amino, a carbocyclic aryl radical of up to 12 carbon atoms, or methyl sulphydryl, in an inert solvent.

2. A process as claimed in claim 1 wherein the compound of formula (II) is formamidine, acetamidine, propionamidine, benzamidine, guanidine, N-methyl-guanidine, N,N-dimethyl-guanidine, N-phenyl-guanidine or N-tolylguanidine.

3. A process as claimed in claim 1 wherein reaction takes place at a temperature from 20° to 160°C.

4. A process as claimed in claim 3 wherein the temperature is from 40° to 60°C.

5. A process as claimed in claim 1 wherein the solvent is methanol, ethanol, propanol, dioxan or dimethyl formamide.

6. A substituted 4- aminoquinazoline of the formula:

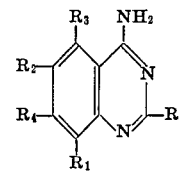

in which:
$R_3$ and $R_4$ each represents hydrogen, methyl or methoxy
$R_1$ and $R_2$ each represent nitro, cyano, methyl sulphonyl or phenyl sulphonyl,
R is hydrogen, alkyl of up to four carbon atoms, amino, mono or di-methyl substituted amino, a carbocyclic aryl radical of up to 12 carbon atoms, or methyl sulphydryl.

7. 2,4-diamino-6,8-dinitroquinazoline.
8. 4-amino-6-cyano-8-nitroquinazoline.
9. 2-phenyl-4-amino-6,8-dinitroquinazoline.

* * * * *

UNITED STATES PATENT OFFICE
CERTIFICATE OF CORRECTION

Patent No. 3,689,489  Dated September 5, 1972

Inventor(s) Klaus Wagner and Ernst Roos

It is certified that error appears in the above-identified patent and that said Letters Patent are hereby corrected as shown below:

Col. 2, line 20, insert:

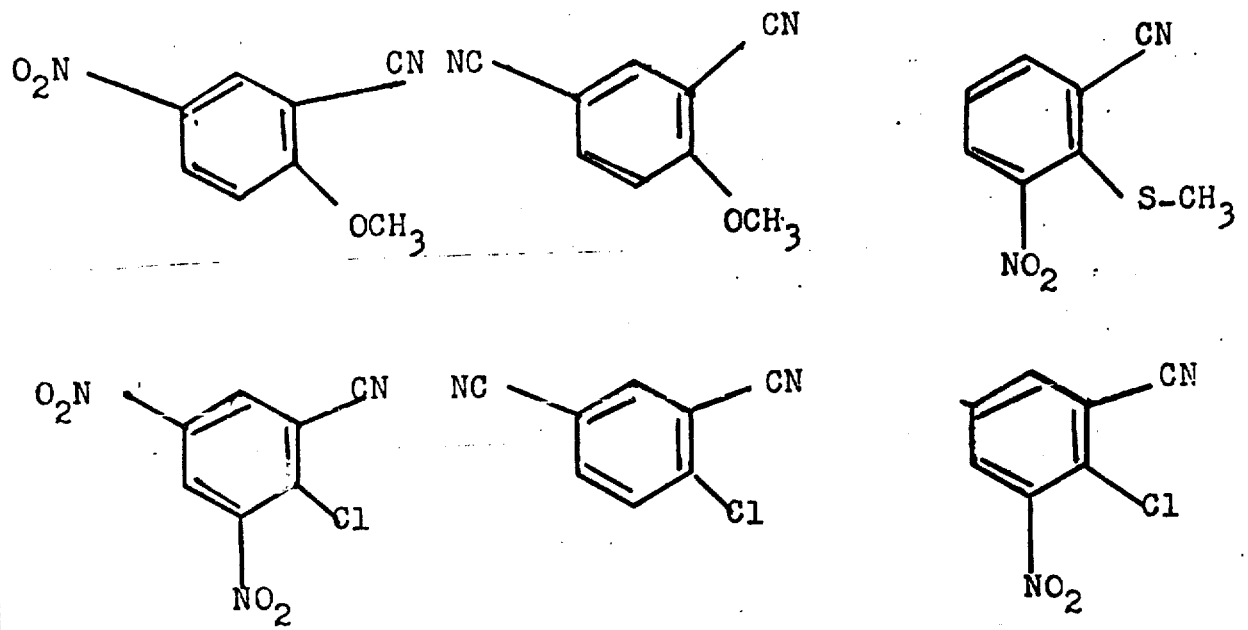

Signed and sealed this 13th day of March 1973.

(SEAL)
Attest:

EDWARD M. FLETCHER, JR.
Attesting Officer

ROBERT GOTTSCHALK
Commissioner of Patents